UNITED STATES PATENT OFFICE 2,651,572

PRESERVATION OF FORAGE CROPS WITH PHENOL DERIVATIVES

Emanuel M. Bickoff, Berkeley, Calif., assignor to the United States of America as represented by the Secretary of Agriculture No Drawing. Application November 15, 1951, Serial No. 256,590

8 Claims. (Cl. 99—8)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the preservation of forage crops. In particular, the invention relates to the treatment of dried forage crops, such as dried grasses, legumes, and especially alfalfa, so as to stabilize the carotene content of the forage material.

The problem with which this invention is concerned may be illustrated by the following reference to alfalfa:

Alfalfa is widely used as a feed and as an ingredient in mixed feeds for chickens, cattle, and other livestock. It is especially valuable for such purposes because of its high carotene content. Generally, alfalfa is used in the form of a meal prepared by harvesting fresh alfalfa, drying it and comminuting the dried alfalfa to a meal. In this form the alfalfa will not spoil and can be readily bagged for storage or shipping. One problem that has beset the industry, however, is that upon storage certain chemical changes take place whereby the carotene content is rapidly decreased. For example if the meal is stored at 80° F., it loses about two-thirds of its carotene content in 24 weeks. Of course, at higher temperatures such as prevail in barns or warehouses in summer, the rate of carotene loss is greatly accelerated.

It has now been found that the carotene content of alfalfa or other forage crop is stabilized if certain phenol derivatives are incorporated therewith. The phenol derivatives which are envisaged by this invention are compounds containing two alkylphenol nuclei linked through their 2 positions to a bivalent aliphatic radical. Their chemical structure is represented by the following formula:

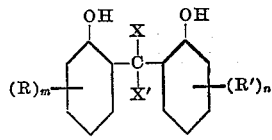

wherein R and R' are alkyl radicals as for example, methyl, ethyl, propyl, isopropyl, butyl, amyl, hexyl, heptyl, octyl, decyl, dodecyl, etc. $m$ and $n$ are integers from 1 to 4; X and X' are hydrogen or alkyl radicals, as for example, methyl, ethyl, propyl, butyl, etc.

Only a small amount of the above-described agents are required to obtain the stabilizing effect, i. e., from about 0.01% to about 0.5% based on the amount of forage material. Obviously the higher the proportion of stabilizing agent the greater will be the stabilizing effect.

The agents are generally applied to the forage in the form of a solution or emulsion so that the small proportion of this material can be applied uniformly. Suitable solvents are, for example, ethylene glycol monoethyl ether, deodorized kerosene, ethanol, n-propanol, iso-propanol, n-butanol, propylene glycol, and glyceride oils such as cottonseed oil, soybean oil, coconut oil, corn oil, peanut oil, sesame oil, and so forth. Glyceride oils, especially crude vegetable oils are preferred solvents as they reduce dustiness of the dehydrated forage and further in some cases, alfalfa, for example, they give it an enhanced green color. In using a glyceride oil as the solvent it is preferred to first dissolve the stabilizing agent in a small amount of acetone and then mix this solution with the oil. In this way solution of the stabilizing agent is more readily attained. Generally, the beneficial effect of the glyceride oil is attained when applied in a proportion of from about 0.5% to about 5%, based on the amount of forage.

In preparing the emulsion form of the stabilizing agent, a solution of the stabilizing agent in any of the aforementioned solvents is first prepared and a small proportion of an emulsifying agent is dissolved therein. The resulting solution is then agitated with a large volume of water thereby to produce the emulsion. Many different emulsifying agents can be used, for example, sorbitan mono-oleate, the polyoxyalkylene ether of sorbitan mono-oleate, a polyglyceride of a glyptal resin, and so forth. The concentration of the stabilizing agent in the solution or emulsion is not critical, generally for convenience a 5 to 10% solution is used. The most convenient method of applying the solution of the stabilizing agent is to spray it onto the forage. To secure uniform impregnation, the forage is preferably agitated by suitable means during the spraying to expose all surfaces thereof to the spray. Thus one practical method involves tumbling the forage about in a rotating drum while the solution is sprayed into the interior of the drum. Another method involves allowing the forage to fall through a tower equipped with baffles while it is sprayed with the solution on its passage through the tower. It is evident that any other apparatus or method which is adapted to obtain uniform impregnation can be used. The solution or emulsion of the stabilizing agent can be applied to the green forage, to the finished dehydrated forage, or it can be applied to the forage at various stages in its processing. Thus for example, the solution can be applied to the forage after it is dehydrated but before it is comminuted to form a meal. Further, the solution can be applied while the dehydrated forage is being milled to produce the meal.

The following example discloses steps and conditions within the scope of this invention. It is understood that this example is furnished only by way of illustration and not limitation.

*Example*

A 200-gram sample of dehydrated alfalfa meal was placed in a rotatable cylinder provided with baffles. While rotating the cylinder to cause thorough agitation of the meal, the meal was sprayed with 4 ml. of an ethylene glycol monoethyl ether solution containing 0.25 gram of 2,2'-methylene bis(4 - methyl - 6 - tertiarybutyl phenol). The treated meal therefore contained 0.125% of the stabilizing agent.

Samples of the treated meal and a sample of the untreated meal (control) were stored in open vessels at 65° C. and the carotene content of each sample was determined after storage for 14 days at this temperature. The carotene contents after storage were compared with the original carotene content of the meal to determine the proportion of carotene remaining in the meal after storage. The following results were obtained:

| Expt. No. | Antioxidant | Proportion of original carotene remaining in meal after storage at 65° C. for 14 days, percent |
|---|---|---|
| 1 | none used (control) | 22 |
| 2 | 0.125% of 2,2'-methylene bis(4-methyl-6-tertiarybutyl phenol) | 48 |

The antioxidant used in the above example has the formula

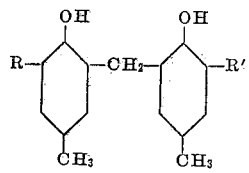

wherein R and R' are tertiary butyl radicals.

It has been established that the above-described phenol derivatives stabilize the carotene content of forage crops. The mechanism of the stabilization is not known although the foregoing data indicate that the agents act as a negative catalyst in preventing oxidation of the carotene. The powerful stabilizing effect of these compounds in this respect is surprising because many known antioxidants have little if any effect on the stabilization of carotene in alfalfa when used under conditions similar to those used with the compounds contemplated by the present invention. This fact is shown by the following experiments:

A series of 200-gram samples of dehydrated alfalfa meal were each treated with a solution of a known antioxidant using the spray technique set forth in the example. In each case, the solution contained 0.25 gram of the antioxidant and was made up to a volume of 4 ml. with ethylene glycol monoethyl ether. In each case the treated meal contained 0.125% of the antioxidant. An untreated sample (control) and the treated samples were stored at 65° C. in open vessels and then analyzed for carotene content. The carotene contents after storage were compared with the original carotene content of the meal to determine the proportion of original carotene remaining in the meal after storage. The following results were obtained:

| Expt. No. | Antioxidant | Proportion of original carotene remaining in meal after storage at 65° C. for 14 days, percent |
|---|---|---|
| 1 | none used (control) | 22 |
| 2 | nordihydroguaiaretic acid | 24 |
| 3 | thiodipropionic acid | 24 |
| 4 | lauryl thiodipropionate | 25 |
| 5 | ethyl gallate | 28 |
| 6 | propyl gallate | 26 |
| 7 | catechol | 25 |
| 8 | pyrogallol | 29 |
| 9 | hydroquinone monomethyl ether | 25 |
| 10 | p-tertiary butyl catechol | 31 |
| 11 | diphenylamine | 34 |
| 12 | ethyl hydrocaffeate | 26 |
| 13 | 2,4-dimethyl-6-tertiary-butyl phenol | 26 |

It is to be noted that in the stabilizing agents encompassed by this invention, the phenol nuclei are linked at their 2 positions with the bivalent aliphatic radical

This type of linkage is critical and otherwise similar compounds in which the phenol nuclei are linked at their 4 positions exhibit virtually no stabilizing power with regard to carotene in forage crops. This fact is evidenced by the following experiments.

Samples of dehydrated alfalfa meal were sprayed with ethyleneglycol monoethyl ether solutions of the compounds: 4,4'-isopropylidene bis(phenol); 4,4'-isopropylidene bis(2-methylphenol); 4,4'-isopropylidene bis(2-isopropylphenol). In each case, 0.125% of the agent was applied. The samples of sprayed alfalfa meal and an untreated sample (control) were stored in open vessels at 65° C. for 14 days. The results obtained are shown in the following table:

| Expt. No. | Antioxidant | Proportion of original carotene remaining in meal after storage at 65° C. for 14 days, percent |
|---|---|---|
| 1 | none used (control) | 22 |
| 2 | 4,4'-isopropylidene bis(phenol) | 23 |
| 3 | 4,4'-isopropylidene bis(2-methyl phenol) | 24 |
| 4 | 4,4' - isopropylidene bis(2 - isopropyl phenol) | 24 |

The formula of the compounds used in the above experiments are:

Expt. 2

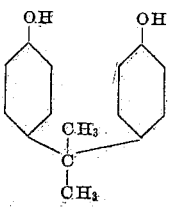

Expt. 3

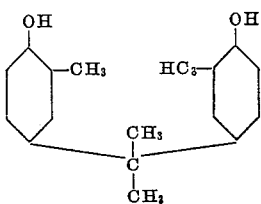

Expt. 4

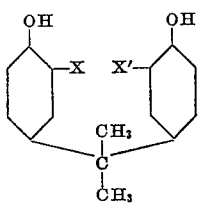

X and X' are isopropyl radicals.

Having thus defined my invention, I claim:

1. The process of stabilizing a forage crop which comprises incorporating therewith a compound containing two alkylphenol nuclei linked at their 2 positions to a bivalent aliphatic radical, said compound having the formula:

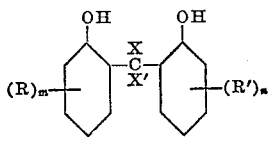

wherein R and R' are alkyl radicals, $m$ and $n$ are integers from 1 to 4, and X and X' are each a member of the group consisting of hydrogen and alkyl radicals.

2. The process of stabilizing a forage crop which comprises incorporating therewith, 2,2'-methylene-bis(4-methyl-6-tertiarybutyl phenol).

3. The process of claim 1 wherein the forage crop is alfalfa.

4. The process of claim 2 wherein the forage crop is alfalfa.

5. A stabilized forage product comprising a forage crop having incorporated therewith a compound containing two alkylphenol nuclei linked at their 2 positions to a bivalent aliphatic radical, said compound having the formula:

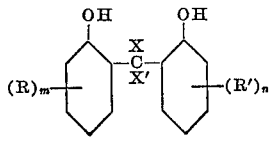

wherein R and R' are alkyl radicals, $m$ and $n$ are integers from 1 to 4, and X and X' are each a member of the group consisting of hydrogen and alkyl radicals.

6. A stabilized forage product comprising a forage crop having incorporated therewith 2,2'-methylene-bis(4-methyl-6-tertiarybutyl phenol).

7. The product of claim 5 wherein the forage crop is alfalfa.

8. The product of claim 6 wherein the forage crop is alfalfa.

EMANUEL M. BICKOFF.

References Cited in the file of this patent

UNITED STATES PATENTS

| Number | Name | Date |
|---|---|---|
| 2,482,635 | Petering et al. | Sept. 20, 1949 |
| 2,513,002 | Chenicek | June 27, 1950 |
| 2,570,402 | Stevens et al. | Oct. 9, 1951 |